Reissued Nov. 5, 1946

Re. 22,808

UNITED STATES PATENT OFFICE 22,808

ANTIOXIDANTS

Louis H. Howland, Watertown, and Philip T. Paul, Naugatuck, Conn., assignors to United States Rubber Company, New York, N. Y., a corporation of New Jersey No Drawing. Original No. 2,377,423, dated June 5, 1945, Serial No. 396,580, June 4, 1941. Application for reissue May 23, 1946, Serial No. 671,889

7 Claims. (Cl. 260—800)

This invention relates to improvements in antioxidants.

An object of the invention is to provide chemicals for retarding the deterioration of organic substances which tend to deteriorate by absorption of oxygen from the air, such as rubber or allied gums, artificial rubber-like materials such as neoprene (polychloroprene), and buna (polyolefines), unsaturated fatty oils such as unsaturated vegetable oils, essential oils, petroleum oils and their derivatives, such as gasoline, lubricants, soaps, aldehydes, paints, and the like. A further object of the invention is to provide chemicals which additionally act to improve the resistance of rubber to cracking when subjected under strain to atmospheric conditions. Further objects will be apparent from the following description.

According to the invention the organic substances have incorporated therein a product of reaction of a diene and an aromatic amine selected from a class consisting of primary, and secondary amines. The amine may contain more than one amine group and the aromatic nucleus attached to the amine nitrogen atom may contain various substituents. Exemplary of amines that may be reacted with the diene are: aniline, o-toluidine, m-toluidine, p-toluidine, p-chloroaniline, p-bromo aniline, p-allyloxy aniline, p-amino isopropenyl benzene, o-amino ethyl benzene, m-amino isopropyl benzene, p-amino tertiary butyl benzene, p-amino diphenyl, o-anisidine, m-anisidine, p-anisidine, p-phenetidine, p-phenoxy aniline, p-amino phenol, alpha naphthylamine, beta naphthylamine, 1,4 naphthalene diamine, diphenylamine, p-methoxy diphenylamine, p-methallyloxy diphenylamine, 2-4 dimethyl aniline, thio p-anisidine, 4-amino diphenylamine, 4-amino 4'-methyl diphenylamine, 4,4'-diamino diphenyl methane, 3,3'-diamino diphenyl methane, 2,2'-diamino diphenyl methane, p-phenylene diamine, m-phenylene diamine, o-phenylene diamine, N,N'-diphenyl p-phenylene diamine, 4-amino N-methyl diphenylamine, 4-methyl phenyl amino diphenylamine, benzidine, p-tolylene diamine, 4,4' diamino diphenyl ether, 4,4' diamino diphenyl sulfide, 4,4' diamino diphenyl disulfide, 4,4' diamino diphenylamine, 4, amino phenyl beta-naphthylamine, and 4 amino phenyl alpha napthylamine, N-ethyl aniline, N-butyl aniline, etc.

Examples of dienes that may be reacted with any of the above aromatic amines for the purpose of the invention are: butadiene, isoprene, 2-chloro-1,3-butadiene, 2,3 dimethyl 1,3 butadiene, 1,3 dimethyl 1,3 butadiene, 1,1 dimethyl 1,3 butadiene, 1,2 diethyl 1,3 butadiene, 1,5 hexadiene, 1,6 heptadiene, 1,4 dimethyl 1,3 butadiene, 1-phenyl 1,3 butadiene, 2-phenyl 1,3 butadiene, 2-p-tolyl 1,3 butadiene, 1-p-xenyl 1,3 butadiene, 1,4 pentadiene, 1 vinyl, 1,3-butadiene, cyclopentadiene, and cyclohexadiene, etc.

The reaction products of the invention are generally prepared by reacting the diene with the amine at an elevated temperature, preferably in the range from about 100 to about 200° C., in the presence of suitable acidic catalysts, the proportion of the diene in the reaction mix being, as illustrated in Examples 1–8, in molecular excess compared to the molecular proportion of the amine. Either organic or inorganic solvents may be used such as acetic acid, alcohol, water, dioxane, acetone, methyl ethyl ketone, etc. As condensing agents, acidic substances such as the following may be used: iodine, bromine, chlorine, hydriodic acid, hydrobromic acid, hydrochloric acid, sulfuric acid, oxalic acid, aluminum chloride, ferrous chloride, hydrofluoric acid, succinic acid, chromic chloride, manganese chloride, acide activated bleaching earths.

The chemicals have special and outstanding properties in connection with the preservation of rubber and vulcanized rubber goods against the deterioration by oxygen, heat, or flexing. Although some of the products are crystalline, a great many of them are either thick syrups or resins having very little odor per se and imparting substantially no odor to rubber. They are general volatile in sub-atmospheric pressures without decomposition. They are generally very soluble in rubber and may be used in large amounts with substantially no danger of blooming to the surface.

The constitution of these reaction products is unknown, but it is believed that they contain an appreciable amount of heterocyclic substances of saturated quinoline and of indole structure. In the case of aniline and butadiene the reaction is believed to be:

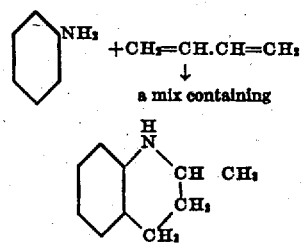

2 methyl tetra hydro quinoline

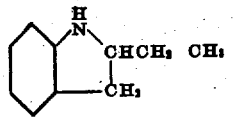

2 ethyl 2,3 dihydro indole

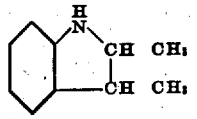

2,3 dimethyl 2,3 dihydro indole

The following examples are given to illustrate the preparation of the chemicals, and the effectiveness of their use in rubber. The parts are by weight:

Example 1

1,3 dimethyl 1,3 butadiene (21.5 grams), 22 grams p,p′ diamino diphenyl methane and a trace of iodine as catalyst were autoclaved over night at 200° C. The product was dissolved in benzene, washed with dilute sodium hydroxide, dried and the benzene removed by distillation. The residue was freed from unreacted p,p′ diamino diphenyl methane by distilling until the temperature reached 230° C. at 3 mm. (mercury pressure).

Example 2

1,3 dimethyl 1,3 butadiene (16 grams), 30 grams 4 methyl 4′ amino diphenylamine and an 0.3 gram of iodine as catalyst were autoclaved over night at 200° C. The reaction product was dissolved in benzene, washed with dilute sodium hydroxide, dried and the benzene removed. The residue was freed from unreacted 4 methyl 4′ amino diphenylamine by distilling to 220° at 5 mms. The product then distilled 220–240° C. at 5 mms. (mercury pressure).

Example 3

Benzidine (25 grams), 1,3 dimethyl 1,3 butadiene (29 grams) and 0.1 gram iodine were autoclaved over night at 200° C. The product was dissolved in benzene, washed with dilute caustic, dried and the solvent removed.

Example 4

Butadiene (25 grams), p,p′ diamino diphenyl methane (40 grams) and 0.1 gram iodine were autoclaved over night at 200° C. The product was dissolved in benzene, washed with dilute sodium hydroxide and the benzene removed. Unreacted p,p′ diamino diphenyl methane was removed by fractionation in vacuum.

Example 5

1,3 dimethyl 1,3 butadiene (41 grams), 21.6 grams p-phenylene diamine and 0.1 gram iodine were autoclaved over night at 200° C. The product was worked up as in Example 1. Unreacted p-phenylene diamine was removed by vacuum fractionation up to 130° C. at 5 mms. (mercury pressure). The product distilled 130–280° C. at 5 mms.

Example 6

Aniline (45 grams), 1,3 dimethyl 1,3 butadiene (52 grams) and 1.0 gram iodine were heated under reflux 12 hours. The reaction product was dissolved in benzene, washed with dilute sodium hydroxide, dried and the benzene removed by evaporation. The product distilled 110–119° C. at 3 mms. (mercury pressure). Only a trace of unreacted aniline was present.

Example 7

Diphenylamine (50.7 grams), 1,3 dimethyl 1,3 butadiene (32.8 grams), zinc chloride (5 grams) were dissolved in 100 ccs. acetic acid and the solution refluxed 12 hours. Benzene and excess dilute sodium hydroxide were added and the separated benzene extract washed with water, dried and the benzene removed by evaporation. The residue was vacuum fractionated.

*Fraction I*

Boiling range 120–190° C. at 3 mms. mercury pressure (unreacted diphenylamine).

*Fraction II*

Clear resin. Melting range 80–85° C.

From this resin a small amount of crystalline material, melting point 113–114° C. was isolated.

Example 8

N,N′ diphenyl p-phenylene diamine (33.5 grams), 15.7 grams 1,3 dimethyl 1,3 butadiene, 5 grams zinc chloride and 125 ccs. acetic acid were refluxed 17 hours. The product was isolated as in Example 6; melting range 95–100° C.

The chemicals are tested in a rubber stock of the composition:

*Master batch*

| | Parts |
|---|---|
| Pale crepe | 100 |
| Zinc oxide | 10 |
| Lithopone | 60 |
| Whiting | 60 |
| Zinc soap of cocoanut oil fatty acids | 0.50 |
| Sulfur | 3 |
| Tetramethyl thiuram monosulfide (accelerator) | 0.15 |

The anti-oxidant to be tested was incorporated in the ratio of one (1.0) part to 100 parts rubber. Cures were made for 10, 20, and 30 minutes at 30 pounds per square inch steam pressure.

The following data shows the tensile in pounds per square inch and percent elongation at break, before and after ageing 96 hours in oxygen under 300 pounds per square inch pressure.

| Cure at 30 pounds steam | Control | p,p′ Diamino diphenyl methane-1,3 dimethyl 1,3 butadiene reaction product |
|---|---|---|
| UNAGED | | |
| 10 minutes | 2,660–730 | 2,640–703 |
| 20 minutes | 2,500–703 | 2,540–696 |
| 30 minutes | 2,220–700 | 2,240–673 |
| AGED | | |
| 10 minutes | 840–573 | 2,300–653 |
| 20 minutes | Failed | 1,900–603 |
| 30 minutes | Failed | 1,620–586 |

| Cure at 30 pounds steam | Control | 4 methyl 4' amino diphenyl-amine-1,3 dimethyl 1,3 butadiene reaction product |
|---|---|---|
| UNAGED | | |
| 10 minutes | 2,660–730 | 2,680–736 |
| 20 minutes | 2,500–703 | 2,660–696 |
| 30 minutes | 2,220–700 | 2,440–673 |
| AGED | | |
| 10 minutes | 840–573 | 2,200–695 |
| 20 minutes | Failed | 2,160–650 |
| 30 minutes | Failed | 1,840–616 |

| Cure at 30 pounds steam | Control | Benzidine-1,3 dimethyl 1,3 butadiene reaction product |
|---|---|---|
| UNAGED | | |
| 10 minutes | 2,660–730 | 2,640–700 |
| 20 minutes | 2,500–703 | 2,660–676 |
| 30 minutes | 2,220–700 | 2,460–683 |
| AGED | | |
| 10 minutes | 840–673 | 2,520–646 |
| 20 minutes | Failed | 2,160–633 |
| 30 minutes | Failed | 1,900–606 |

| Cure at 30 pounds steam | Control | p,p' Diamino diphenyl methane-butadiene reaction product |
|---|---|---|
| UNAGED | | |
| 10 minutes | 2,660–730 | 2,686–713 |
| 20 minutes | 2,500–703 | 2,560–696 |
| 30 minutes | 2,220–700 | 2,420–690 |
| AGED | | |
| 10 minutes | 840–573 | 2,120–630 |
| 20 minutes | Failed | 1,500–590 |
| 30 minutes | Failed | 680–563 |

| Cure at 30 pounds steam | Control | p-Phenylene diamine-1,3 dimethyl 1,3 butadiene reaction product |
|---|---|---|
| UNAGED | | |
| 10 minutes | 2,660–730 | 2,900–693 |
| 20 minutes | 2,500–703 | 2,700–656 |
| 30 minutes | 2,220–700 | 2,420–630 |
| AGED | | |
| 10 minutes | 840–573 | 2,280–616 |
| 20 minutes | Failed | 2,000–580 |
| 30 minutes | Failed | 1,740–550 |

*Tread master batch*

| | Parts |
|---|---|
| Smoked sheet | 100 |
| Carbon black | 45 |
| Zinc oxide | 5 |
| Pine tar | 3.5 |
| Zinc soap of cocoanut oil fatty acids | 3.5 |
| Sulfur | 3.0 |
| Mercaptobenzothiazole (accelerator) | 1.0 |

The anti-oxidant to be tested was incorporated in the ratio of one (1.0) part to 100 parts rubber. Cures were made for 45, 60 and 75 minutes at 30 pounds per square inch steam pressure. Tensiles before and after ageing 96 hours under 300 pounds per square inch oxygen are:

| Cure at 30 pounds steam | Control | Aniline-1,3 dimethyl 1,3 butadiene reaction product |
|---|---|---|
| UNAGED | | |
| 45 minutes | 4,080–680 | 4,040–663 |
| 60 minutes | 4,180–660 | 4,190–630 |
| 75 minutes | 4,060–616 | 4,000–616 |
| AGED | | |
| 45 minutes | 1,000–420 | 2,600–620 |
| 60 minutes | 740–323 | 2,410–560 |
| 75 minutes | 620–280 | 2,300–510 |

| Cure at 30 pounds steam | Control | Diphenyl-amine-1,3 dimethyl 1,3 butadiene |
|---|---|---|
| UNAGED | | |
| 45 minutes | 3,580–690 | 3,780–696 |
| 60 minutes | 3,780–663 | 3,780–663 |
| 75 minutes | 3,800–626 | 3,800–656 |
| AGED | | |
| 45 minutes | 1,080–423 | 2,460–660 |
| 60 minutes | 780–300 | 2,260–533 |
| 75 minutes | 700–300 | 2,090–493 |

| Cure at 30 pounds steam | Control | Diphenyl p-phenylene diamine-1,3 dimethyl 1,3 butadiene reaction product |
|---|---|---|
| UNAGED | | |
| 45 minutes | 3,580–690 | 3,780–686 |
| 60 minutes | 3,780–663 | 3,820–660 |
| 75 minutes | 3,800–626 | 3,810–630 |
| AGED | | |
| 45 minutes | 1,080–423 | 2,440–566 |
| 60 minutes | 780–300 | 2,190–493 |
| 75 minutes | 700–300 | 1,960–453 |

It is to be understood that the invention may be applied to the preservation of natural rubber compositions as well as artificially-prepared rubber compositions, including reclaimed rubbers, and latices of such rubber compositions.

It is also to be understood that other desired filling and compounding ingredients may be incorporated along with the preservative, for example, in the case of rubber there may be incorporated other accelerators, softeners, etc.

The anti-oxidant may be incorporated in any type of rubber composition such as those used for automobile tires and tubes, hose, belting, sheet and thread rubber, rubberized fabrics, molded goods, boots and shoes, etc., where vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement, the anti-oxidant may be dissolved there in a suitable small proportion. The anti-oxidant may be incorporated into solid substances by milling or mastication and prepared for incorporation into dispersions or solutions either in powder, paste, or solution form, or applied in such forms for incorporation by diffusion to the surfaces of vulcanized or unvulcanized rubber goods.

Having thus described our invention, what we claim and desire to protect by Letters Patent is:

1. A method of preserving organic substances which tend to deteriorate by absorption of oxygen from the air which comprises incorporating therein a product of reaction at a temperature in the range from about 100° C. to about 200° C. in the presence of an acidic catalyst of a monomeric 1,3 butadiene hydrocarbon and a primary aromatic polyamine compound, said amino groups being primary amino groups, the proportion of the said butadiene in the reaction mix being in molecular excess compared to the molecular proportion of the amine.

2. A method of preserving organic substances which tend to deteriorate by absorption of oxygen from the air which comprises incorporating therein a product of reaction at an elevated temperature in the presence of an acidic catalyst of 1,3,dimethyl 1,3,butadiene, 4,4' - diamino diphenyl methane, the proportion of said butadiene in the reaction mix being in molecular excess compared to the molecular proportion of the said amino compound.

3. A method of preserving rubber compositions which comprises incorporating therein a product of reaction at an elevated temperature in the presence of an acidic catalyst of 1,3,dimethyl 1,3 butadiene, and 4,4' - diamino diphenyl methane, the proportion of the said butadiene in the reaction mix being in molecular excess compared to the molecular proportion of the said amino compound.

4. An organic substance which tends to deteriorate by absorption of oxygen from the air containing a product of reaction at an elevated temperature in the presence of an acidic catalyst of 1,3,dimethyl 1,3 butadiene, and 4,4'-diamino diphenyl methane, the proportion of the said butadiene in the reaction mix being in molecular excess compared to the molecular proportion of the said amino compound.

5. A method of preserving organic substances which tend to deteriorate by absorption of oxygen from the air which comprises incorporating therein a product of reaction at an elevated temperature in the presence of an acidic catalyst of a monomeric 1,3 butadiene hydrocarbon and a diamino diphenyl methane, said amino groups being primary amino groups, the proportion of the said butadiene in the reaction mix being in molecular excess compared to the molecular proportion of the said amino compound.

6. A method of preserving rubber compositions which comprises incorporating therein a product of reaction at an elevated temperature in the presence of an acidic catalyst of a monomeric 1,3 butadiene hydrocarbon and a diamino diphenyl methane, the said amino groups being primary amino groups, the proportion of the said butadiene in the reaction mix being in molecular excess compared to the molecular proportion of the said amino compound.

7. A method of preserving organic substances which tend to deteriorate by absorption of oxygen from the air which comprises incorporating therein a product of reaction, at an elevated temperature, in the presence of an acidic catalyst a monomeric 1,3 butadiene hydrocarbon and para-phenylene diamine, the proportion of the said butadiene in the reaction mix being in molecular excess compared to the molecular proportion of the said diamine.

LOUIS H. HOWLAND.
PHILIP T. PAUL.